May 21, 1963 R. R. TEETOR 3,090,460
SPEED CONTROL DEVICE FOR AN AUTOMOTIVE VEHICLE
Filed July 17, 1959 4 Sheets-Sheet 1

INVENTOR.
Ralph R. Teetor
BY
Davis, Lindsey, Hibben & Noyes
Attys.

May 21, 1963  R. R. TEETOR  3,090,460
SPEED CONTROL DEVICE FOR AN AUTOMOTIVE VEHICLE
Filed July 17, 1959  4 Sheets-Sheet 2

INVENTOR.
Ralph R. Teetor
BY
Davis, Lindsey, Hibben & Noyes
Attys.

United States Patent Office 3,090,460
Patented May 21, 1963

3,090,460
SPEED CONTROL DEVICE FOR AN AUTOMOTIVE VEHICLE
Ralph R. Teetor, Hagerstown, Ind., assignor to Perfect Circle Corporation, Hagerstown, Ind., a corporation of Indiana
Filed July 17, 1959, Ser. No. 827,745
21 Claims. (Cl. 180—82.1)

This invention relates generally to speed control devices and more particularly to improvements in a speed control device for an automotive vehicle.

An important object of the invention is to provide a speed control device having means for maintaining a vehicle at a substantially constant predetermined speed without requiring the driver to actuate the usual speed controlling accelerator pedal, the device including means for preventing operation of the device to maintain the vehicle at such predetermined speed until the vehicle has been brought up to such speed.

Another object is to provide, in a speed control device adapted to maintain a vehicle at a substantially constant predetermined speed and having manually controlled means for adjusting said device to operate at a desired speed, means for preventing operation of said device whenever said manually controlled means is adjusted to a predetermined high value.

A further object of the invention is to provide, in a speed control device for a vehicle, which includes a governor having centrifugal weights and drive means for rotating said weights in timed relation to the speed of the vehicle, and means permitting slippage between said governor and said drive means to prevent damage to the parts of the device due to sudden differences in speed between the vehicle wheels and the governor.

Still another object of the invention is to provide a speed control device for a vehicle, having manually controlled means for adjusting said device to vary the speed at which said device becomes operative, and means permitting adjustment of said manually controlled means for a higher or lower speed with substantially the same effort.

A further object of the invention is to provide a speed control device including a governor and a governor spring, manually controlled means including a Bowden wire for adjusting said spring, and a novel connection between said Bowden wire and said spring.

Other objects and advantages of the invention will become apparent from the following description taken in connection with the accompanying drawings, in which.

In my copending application for patent entitled "Speed Control Device for an Automotive Vehicle," Serial No. 686,817, filed September 30, 1957, now Patent No. 2,973,051, I have disclosed and claimed a speed control device which, when installed on an automotive vehicle, is operable to offer a resistance to advancing movement of the accelerator pedal or throttle control member when the latter is advanced to a position corresponding to a speed greater than a predetermined vehicle speed, so that the driver is thus made aware of the speed of the vehicle. The device is also operable to automatically maintain the vehicle at a substantially constant predetermined speed, without requiring the driver to actuate the accelerator pedal, the device being effective to maintain the predetermined speed regardless of changing road conditions such as hills and curves. The device further is arranged to permit the driver to operate the vehicle at a speed greater than the predetermined speed by overcoming the resistance to movement of the accelerator pedal, and when the device is functioning to automatically maintain the vehicle at a substantially constant speed, the device may be disabled by a slight actuation of the vehicle brake pedal, so that the vehicle is returned to conventional or normal operation.

The device shown in said copending application utilizes electrically driven means to provide the resistance to advancing movement of the accelerator pedal, and electrical holding means for automatically maintaining the vehicle at a substantially constant speed, both electrical means being operated from the vehicle battery which supplies substantially constant power. Adjustment of the device to vary the predetermined speed at which resistance to advancing movement of the accelerator pedal is reached, or the speed at which the vehicle will be automatically maintained after energization of the holding means, is readily accomplished by manually controlled means which may be mounted on the dash panel or the steering wheel of the vehicle.

A device embodying the present invention functions in generally the same manner as a device disclosed in my aforementioned copending application, but includes a number of changes which improve the safety of operation of a vehicle equipped with the device, as well as permitting a simpler installation, adjustment, and operation of the device. Thus, the present device generally comprises an operating member or element adapted to be connected to the accelerator pedal or throttle control member, of the vehicle for movement therewith, an actuating member engageable with the operating member, electrical drive means for moving the actuating member in opposite directions, and a governor responsive to vehicle speed and cooperating with said operating member and said actuating member for energizing said drive means for movement in opposite directions. Thus, when the vehicle reaches a predetermined speed, the drive means moves the actuating member into engagement with the operating member to provide a resistance to advancing movement of the accelerator pedal. Manually adjustable means in connection with said governor is provided to vary the speed at which resistance to advancing movement of the throttle control member is encountered. For automatic operation of the vehicle at the predetermined speed, manually controlled electrical coupling means is provided for coupling the actuating member to the operating member, so that movement of the actuating member by the drive means maintains the operating member and hence the throttle control member in a position to hold the vehicle at the predetermined speed. The manually adjustable means is located at a remote point from the device, such as on the dash panel or steering wheel of the vehicle near the driver, and is effective to vary the aforementioned speed at which resistance is met and at which the vehicle will be maintained for automatic operation.

In addition to the foregoing elements, the present device includes means for preventing automatic operation of the vehicle prior to the vehicle reaching the predetermined speed for which the device is set so that the driver will know that such speed can safely be maintained. The present device also includes means for preventing use of the device when said manually adjusted means is set to a predetermined high speed so that the vehicle can be controlled at such high speed only by the normal controls. The present device further includes a friction connection in the governor drive to prevent damage thereto on sudden differences in speed between the vehicle wheels and the governor, means facilitating adjustment of the manually adjusted means to raise or lower the operating speed of the vehicle with substantially the same effort, and means facilitating installation and adjustment of a Bowden wire connection between the manually adjusted means and the governor of the device.

In the drawings, one embodiment of the invention is illustrated and designated generally at 10. The device 10 is adapted to be mounted preferably under the hood of an automotive vehicle (not shown) and is connected to the accelerator pedal or throttle control member by intermediate linkage (not shown). The device also has a cable 11 (FIGS. 1 and 2) that is adapted to be connected to and driven by the transmission or propeller shaft, which rotates in timed relation with the speed of the vehicle. Another cable 12 is connected to the speedometer of the vehicle and is driven at the same speed as the cable 11 by a pair of meshed gears 13 and 14, respectively connected to the cables 11 and 12. The connection between the accelerator pedal of the vehicle and the device 10 is resilient in the sense that a spring (not shown) is provided in the linkage, so that the resistance established by the device at the predetermined speed will oppose advancing movement of the accelerator pedal, but which permits the driver to override the device and advance the pedal against such resistance by causing the spring to yield.

The device 10 includes a housing 16 having a mounting pad 17 that is adapted to be secured to a bracket (not shown) for mounting the device on the vehicle. Most of the movable parts of the device are supported on a stationary shaft 18 which extends through a wall of the housing 16, the shaft having a flange portion 19 (FIG. 2) intermediate its ends secured to the interior of the wall, as by screws 21. A bushing 22 is carried on the shaft 18 to provide a bearing surface for the hub portion 23 of an operating member 24 (FIGS. 1 and 2) mounted in the housing 16. The hub portion 23 extends exteriorly of the housing 16 and has a member 26 mounted thereon, such as a lever or plate, which is adapted to be resiliently connected to the linkage between the throttle control member and carburetor of the vehicle as previously described.

As heretofore mentioned, the device 10 is adapted to provide a resistance to advancing movement of the throttle control member when the vehicle reaches a predetermined speed and, in automatic operation, to maintain the speed of the vehicle substantially constant at the predetermined speed, such speed being adjustable by the driver of the vehicle. In order to provide the aforesaid resistance to advancing movement of the throttle control member or accelerator pedal, the device 10 is provided with an actuating member or element 27 in the form of a lever, which is rotatably mounted on the shaft 18 at the inner side of the flange 19 within the housing 16 by means of a bushing 28. The actuating member 27 includes a yoke 29 having a pair of spaced downwardly extending arms 30 mounted on the bushing 28, and a platform portion 31 on which an electromagnet 32 (FIG. 1) is mounted and enclosed by a casing 33 for a purpose to be described more fully hereinafter. The operating member 24 has its upper end bent to form a laterally extending plate or engaging portion 34 parallel to the axis of the member 24 and adapted to engage the casing 33 of the electromagnet 32 (FIG. 1).

The actuating member 27 is pivotally mounted on the shaft 18 for movement between a range of positions corresponding to the idle and full open positions of the accelerator pedal or throttle control member. Thus, the electromagnet casing 33 of the operating member acts as a stop or abutment to limit further advancement of the accelerator pedal when the device is set to provide resistance.

To this end, drive means in the form of a reversible electric motor 36 mounted on the exterior of the housing 16 is provided for moving the actuating member throughout its range of positions, and means responsive to the speed of the vehicle, in this instance a governor, indicated generally at 37 (FIG. 2), is provided to control the direction of rotation and extent of movement of the actuating member 27. The motor 36 is mounted on the outside of the housing 16 by screws 38, and the housing is provided with an opening 39 (FIG. 1 for receiving the shaft of the motor, indicated at 41. To provide the desired speed reduction and power with a minimum number of parts so that a relatively small motor may be used, the connection between the motor 36 and the actuating member 27 is of the screw and nut type. Thus, the motor shaft is extended at one end into the housing 16 in the form of a screw 43 (see FIGS. 1 and 5) located within the housing 16. Mounted on the screw 43 is a nut 44 of rectilinear form, the nut 44 being mounted between the arms 30 for pivotal and limited radial movement as the arms 30 pivot about the shaft 18. The nut 44 is provided with grooves 45 (FIG. 1) on its opposite sides to receive rollers 40, carried on the lower ends of the spaced arms 30. The end of the screw 43 is rotatably journaled in a bearing assembly 46 in the opposite side wall of the housing 16. Thus, energization of the motor 36 in either direction is effective to move the nut 44 along the screw 43 to pivot the actuating member 27 about the shaft 18. Reference may be made to my copending application and to the Russell Patent No. 2,446,393, issued August 3, 1948, for further details of the construction of the screw and nut type connection 43—44.

Figures 1, 4:
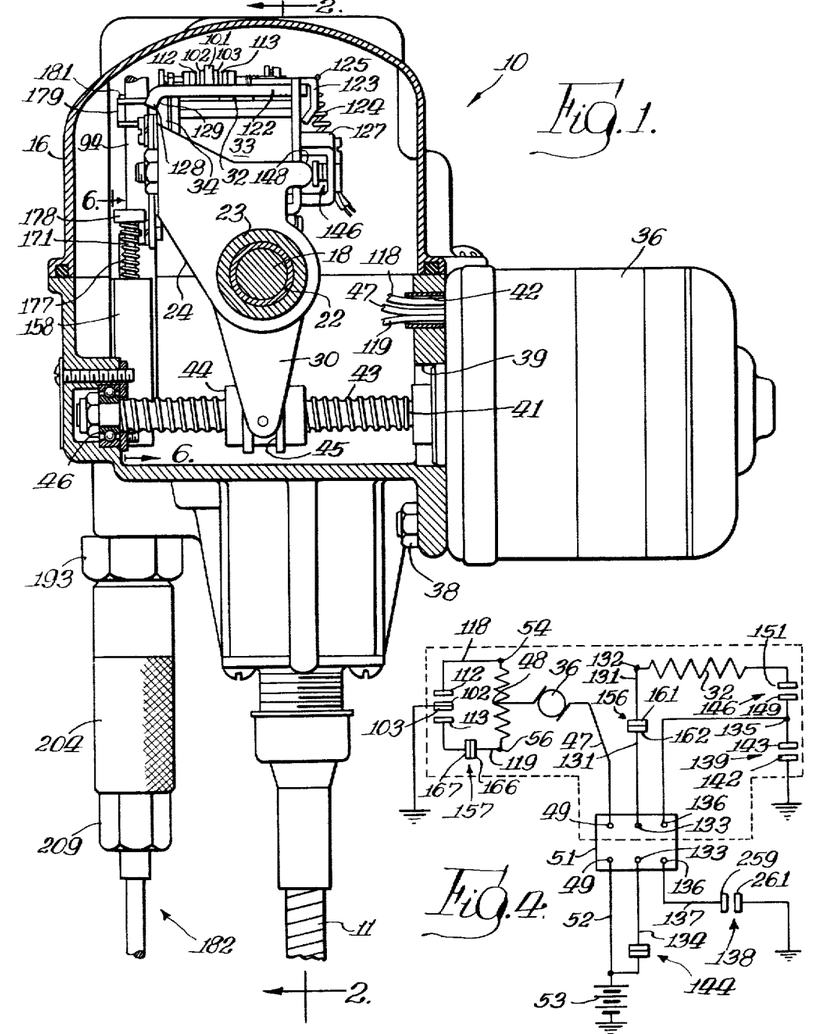
FIG. 1 is a vertical sectional view, partially in section, of a speed control device embodying the features of the invention.
FIG. 4 is a wiring diagram of the electrical circuits of the device.

The operating member 24 is adapted to be swung in a clockwise direction as viewed in FIG. 1, when the accelerator pedal is advanced to open the throttle of the engine, and when the predetermined speed of the vehicle is attained, the motor 36 is adapted to be rotated in a direction to move the actuating member 27 in a counter-clockwise direction into abutment with the operating member 24 and to swing the latter counter-clockwise if necessary. Thus, the screw 43 will be rotated in such direction as to move the nut 44 to the right, as viewed in FIG. 1. The actuating member 27 will therefore be swung counter-clockwise and the casing 33 carried by the actuating member will be moved into engagement with the laterally extending arm or engaging portion 34 of the operating member 24.

Current is supplied to the armature of the motor 36 by a wire 47 (FIGS. 1 and 4) which is connected to a point 48 intermediate the ends of its field winding, the wire 47 being connected to a binding post 49 on a terminal block 51 which extends externally of the housing. The binding post 49 is connected by a wire 52 to the vehicle battery, indicated at 53 in FIG. 4. The respective sides of the field winding of the motor 36, indicated at 54 and 56, are adapted to be selectively grounded to the frame of the vehicle to provide the reversible characteristics thereof.

Energization of the motor 36 to effect the foregoing at a predetermined vehicle speed is dependent on the movement of the operating and actuating members 24 and 27 and the movement of the governor 37 which is mounted in the housing 16. In the present instance the governor 37 comprises a governor weight carrier 61 (FIG. 2) having a pair of governor weights 62 pivotally mounted thereon as at 63, the carrier 61 being mounted on a shaft 64 having an upper, reduced diameter end 66, a central annular radial flange 67, and a lower enlarged end 68. The carrier 61 is normally secured to the shaft 64 by a novel yieldable connection, indicated generally at 69, which forms a part of the present invention and which will be described below. The shaft 64 is rotatably mounted in the housing 16 by a bearing assembly 71 which engages the lower end 68 of the shaft 64 adjacent the carrier 61 and a bearing assembly 72 at a remote reduced diameter portion 73 at the lower end of the shaft 64. A connection 74 for receiving the end of the cable 11 is provided at the remote portion 73. The upper bearing assembly 71 may be retained in a bore 76 in the bottom of the housing 16 by a retaining ring 77 and screws 78.

According to the present invention, the connection 69 between the governor weight carrier 61 and shaft 64 is of the yieldable or friction type, in that it normally maintains a direct or non-yielding connection between the parts but is yieldable upon the application of a predetermined torque to permit movement or slippage therebetween and thus prevent damage to the cable 11. The latter condition may result from inertial loads caused by sudden velocity changes of the drive cable 11 relative to the weight carrier 61, such as when the vehicle is braked and the wheels are locked as upon ice. Thus, the connection 69 preferably comprises a nylon or similar bearing material washer 79, which is disposed between the carrier 61 and the central flange 67 of the shaft 64. The carrier 61 rests on the washer 79 and is biased into tight-gripping frictional engagement therewith by a compression washer 82 disposed above the carrier 61 on the shaft 64. The compression washer 82 in this instance is wavy or undulating, and is maintained in a compressed condition by an overlying back-up washer 83 and snap ring 84 seated in a groove (not shown) in the shaft 64. The groove is positioned on the shaft so that the compression washer 82 will be sufficiently compressed on insertion of the snap ring 84 to maintain the aforesaid frictional engagement between the carrier 61 and shaft 64.

The weights 62 are normally disposed vertically upwardly, and on being rotated by the carrier 61, tend to swing outwardly on their pivots 63. Each governor weight 62 has a transverse inwardly extending arm 86 which engages the outer race of a combined radial and thrust bearing 87 (see FIG. 2) disposed above the ends of the arms 86 and mounted for vertical movement on the shaft 64. The inner race of the bearing 87 abuts the upper end 66 against the ends of a tubular sleeve 88 having a bushing 89 press fitted therein to provide a bearing surface for reciprocating movements of the sleeve 88 the upper end 66 of the shaft 64. Upward movement of the sleeve 88 results from outward movement of the weights 62 about the pivots 63 due to centrifugal force, which movement raises the ends of the arms 86, and thus the sleeve 88 by means of the bearing 87. Means is provided for resisting upward movement of the sleeve 88, which in this instance comprises a trumpet shaped governor spring 91 which is seated at its lower end on an annular flange 92 formed on the sleeve 88.

Adjustment of the downward compressive force of the governor spring 91 on the sleeve 88 is provided by a cap 93 which engages the upper end of the spring, and an axially shiftable governor rod 94 (FIGS. 2 and 5) that is connected to the cap 93 at its upper end and which extends vertically downwardly through the housing 16 for connection to and adjustment by manually controlled means, indicated generally at 96 in FIGS. 7-9, to be described hereinafter. The sleeve 88 is provided with an upwardly extending arm 97 which is offset relative to the axis of the shaft 64 and extends adjacent portions of the actuating and operating members 27 and 24. The upper end of the arm 97 is enlarged as at 98 and has a transverse opening 99 therethrough.

As mentioned above, energization of the motor 36 to effect movement of the actuating member 27 in the respective directions as viewed in FIG. 1 is dependent on the movement of the operating and actuating members 24 and 27 and the action of the governor 37. Thus, an arm 101 (FIGS. 2 and 3) is provided, which is mounted on the inner end of the shaft 18 between the governor 37 and actuating member 27, and which is movable by the governor 37. A pair of electrical contacts 102 and 103 (FIG. 3) are carried on the opposite sides of the arm 101 at its upper end, and are effective to complete a circuit through the respective sides of the field windings of the motor 36 and thereby selectively energize the motor 36 for movement in appropriate directions. Pivotal movement of the arm 101 is controlled by upward and downward movement of the sleeve 88 on the upper end 66 of the shaft 64, this movement being transmitted to the arm 101 by a bell crank 104. The bell crank 104 is mounted on the shaft 18 and is provided with a pin 106 (FIG. 2) which extends transversely from the lower end of the bell crank 104 toward the governor 37. The pin 106 is formed with a ball at its outer end for engagement in the opening 99 at the upper end of the arm 97. Another pin 107 is mounted in the upper end of the bell crank 104 and extends transversely toward the arm 101 into engagement therewith to move it in response to movements of the sleeve 88. A torsion spring 108 is mounted on the end of the shaft 18 and has its ends engaging the arm 101 and pin 107 to maintain these parts engaged and to yield to accommodate further movement of the pin 107 when movement of the arm 101 is arrested.

Figures 2, 3:
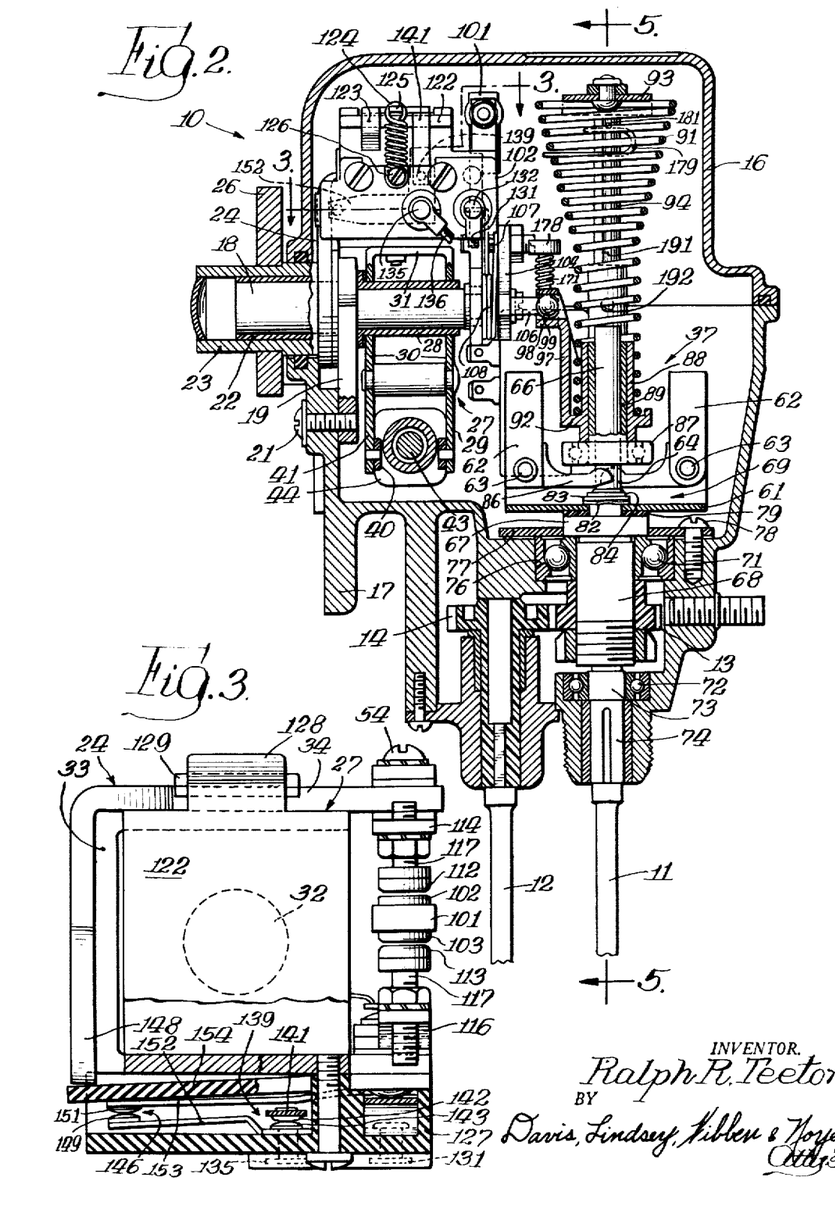
FIG. 2 is a sectional view taken substantially on the line 2—2 of FIG. 1.
FIG. 3 is an enlarged fragmentary sectional view taken on the line 3—3 of FIG. 2.

As will be seen in FIG. 4 in conjunction with FIGS. 1-3, in order to complete a circuit through the respective field windings of the motor 36, a second pair of contacts 112 and 113 are provided for cooperation with the contacts 102 and 103, respectively, the contact 112 being carried on a bar 114 mounted on but insulated from the engaging portion 34 of the operating member 24, and the contact 113 being carried on a bar 116 mounted on and insulated from the actuating member 27. Each of the contacts 112 and 113 is adjustably mounted by means of screws 117, and is connected by wires 118 and 119, to the ends 54 and 56 of the field winding of the motor 36. Thus, the respective sides of the field winding of the motor 36 may be grounded to effect rotation thereof in the respective directions, depending on which pair of contacts are engaged, i.e. 102—112 or 103—113.

With the foregoing structure, when the operating member 24 is swung clockwise, as viewed in FIG. 1, by advancing the accelerator pedal, the speed of the vehicle will increase. When the speed of the vehicle is such that the centrifugal force of the governor weights 62 overcomes the force exerted by the governor spring 91 and the weights swing outwardly, the arm 97 will be moved upwardly, thereby swinging the arm 101 counter-clockwise, as shown in that figure, to bring the contact 102 into engagement with the contact 112 carried by the operating member 24. The side 54 of the field winding of the motor 36 is thereby grounded as indicated in the wiring diagram of FIG. 4.

Thus, when the contacts 102 and 112 are brought into engagement by movement of the operating member 24 and the governor 37, the motor 36 will be energized for one direction of rotation. Such direction is that required to move the nut 44 to the right as viewed in FIG. 1, and the actuating member 27 will be swung counter-clockwise until the casing 33 carried by the actuating member 27 engages the engaging portion 34 of the operating member 24. Continued movement of the actuating member 27 pushes the operating member in a counter-clockwise direction and, when such forced movement of the operating member 24 causes the contacts 102 and 112 to separate, the motor circuit is thereby opened and the motor stops. This occurs at the predetermined speed for which the device is set and, if the driver wishes to maintain such speed, he merely holds the accelerator pedal at the position where the operating member 24 abuts the casing 33 of the actuating member 27. The latter, because of its screw and nut connection with the motor, cannot be moved by pressure of the accelerator pedal, so that a resistance to advancing movement of the accelerator pedal is thereby established at the predetermined speed. If the driver of the vehicle wishes or needs in an emergency to exceed the speed at which resistance occurs, the accelerator pedal may be advanced farther, by overcoming the compressing force of the spring in the linkage between the accelerator pedal and the device 10.

If the driver permits the accelerator pedal to be moved to idle position and the speed of the vehicle decreases, or if road conditions result in a decrease in vehicle speed, such decrease in speed is utilized to energize the motor 36 for rotation in the opposite direction. Such action occurs when the contact 103 on the arm 101 engages the contact 113 on the arm 116 mounted on the actuating member 27. Thus, when the speed of the vehicle decreases, the governor 37 responds to such decrease in speed by causing the arm 97 to be moved downwardly and thereby swing the arm 101 clockwise as viewed in FIG. 1, until the contact 103 engages the contact 113. The motor 36 is thus energized for rotation in the opposite direction as hereinafter described. The nut 44 is consequently moved to the left as viewed in FIG. 1, and the actuating member 27 is swung clockwise out of engagement with the operating member 24. If the accelerator pedal is to be moved to idle position and the speed of the vehicle decreases, the nut 44 moves to the extreme outer end of the screw 43. If the speed of the vehicle decreases to some extent and then remains steady, the nut 44 will be moved to the left until the contact 113 moves out of engagement with the contact 103 and the motor circuit will thus be opened to stop the motor. The actuating member 27 will therefore remain in the position it occupies when the motor stops.

As heretofore mentioned, the operating member 24 is adapted to be coupled to the actuating member 27 so that the accelerator pedal or throttle control member will be held in position such that the vehicle will be maintained at a substantially constant predetermined speed. To this end, the electromagnet 32 is mounted in the casing 33 on the platform portion 31 of the actuating member 27 with its axis perpendicular to the platform portion. An armature plate 122 is hinged on the casing 33 and overlies the electromagnet 32 as shown in FIG. 1. The armature plate 122 includes a downwardly extending arm or stop 123 (FIGS. 1 and 2) which engages a side of the casing 33 to limit the extent of upward movement of the armature plate 122, and a spring 124 is secured at one end to a finger 125 on the armature plate 122 and at its other end to a screw 126 on an insulating block 127 carried on the side of the actuating member 27. The spring 124 is under tension and is effective to normally pull the armature plate 122 upwardly to an inoperative position. The free end of the armature plate 122 is provided with a hook 128 adapted to engage over a beveled upper edge 129 of the engaging portion 34 of the operating member 24 when the electromagnet 32 is energized to secure the members 24 and 27 together. Current is supplied to the electromagnet 32 by a wire 131 (FIGS. 2 and 4) which is connected at one end to a terminal 132 on the insulating block 127, the terminal 132 being connected through contacts in the block 127 to one side of the electromagnet 32. The other end of the wire 131 is connected to a terminal 133 on the terminal block 51, which connects exteriorly of the device 10 by a wire 134 to the vehicle battery 53.

The other end of the electromagnet 32 is adapted to be grounded to provide a current flow therethrough. For initially doing so, the other end of the electromagnet 32 is connected to a terminal 135 on the insulating block 127 which is connected to a terminal 136 on the terminal block 51. Exteriorly of the device 10 the terminal 136 is connected by a wire 137 to a switch, indicated generally at 138 in FIGS. 4 and 7, carried by the manually controlled means 96 remote from the device 10, the switch 138 being grounded. Closing the switch 138 will thus energize the electromagnet 32. The details of the switch 138 will be described in conjunction with the description of the manually controlled means 96 shown in FIGS. 7-9.

As in the speed control device described in my Patent No. 2,973,051, a second or holding switch 139 (FIGS. 2-4) is provided in parallel with the switch 138 for maintaining the electromagnet 32 energized and the operating and actuating members 24 and 27 coupled so that the switch 138 need not be held closed. The switch 139 is adapted to be closed upon movement of the armature plate 122 into engagement with the casing 33 and comprises a downwardly extending arm 141 mounted on the armature plate 122, the lower end of the arm 141 being disposed in an opening in the insulating block 127. A contact 142 is carried on the lower end of the arm 141 for engagement with the contact 143 on the terminal 135 carried in the insulating block 127. The switch 139 is adapted to be closed by movement of the armature plate 122 into engagement with the casing 33, as in FIGS. 1 and 3, thus maintaining a current flow through the electromagnet 32 after the switch 138 is allowed to open, since the electromagnet 32 is grounded through the armature plate 122. The device 10 also includes a normally closed switch 144 (FIG. 4) in the wire 134 which connects the electromagnet 32 to the battery 53. This switch is positioned adjacent the brake pedal and is adapted to be opened by movement thereof. Thus, upon use of the brake, the device is disabled for automatic operation until the switch 138 is again closed.

With the foregoing structure, the device 10, will function in a manner similar to the device described in my aforesaid Patent No. 2,973,051. Thus, with the electromagnet 32 energized and the operating member 24 secured to the actuating member 27, the vehicle will be maintained at the predetermined speed with the driver's foot removed from the accelerator pedal or throttle control member. If the vehicle should fall below the predetermined speed, such as when going up a hill, the governor 37 through the action of the governor weights 62 will cause the arm 101 to move in a direction to close the contacts 103—113, thereby energizing the motor 36 in the direction to move the actuating member 27 and operating member 24, which is secured thereto, in a direction to open the throttle of the vehicle and cause the engine to deliver more power. The speed of the vehicle will thus remain the same. Similarly, if the vehicle starts down a hill or some other condition occurs which would reduce the power required from the engine to maintain a predetermined speed, the governor 37 and weights 62 will cause the arm 101 to move in a direction to close the contacts 102 and 112, thereby energizing the motor in an opposite direction to close the throttle of the vehicle and reduce the power output of the engine. When the vehicle is in a stabilized operating condition and traveling at the predetermined speed, the arm 101 and its contacts 102 and 103 will float between the contacts 112 and 113 as shown in FIG. 3.

According to the present invention, and in the interests of safety, it is desirable to prevent coupling of the operating member 24 to the actuating member 27 until the operation member 24 has been moved into engagement with the actuating member 27. Thus, means is provided which in this instance preferably comprises a normally open switch 146 (FIGS. 1-4) interposed in the circuit to the electromagnet 32, the switch 146 being adapted to be closed, only when the engaging portion 34 of the operating member 24 abuts the electromagnet casing 33. To this end, the switch 146 is placed in circuit between one end of the electromagnet 32 and the terminal 136 on the terminal block 51. As shown in FIGS. 1–3, the switch 146 is disposed within the insulating block 127 for coaction with a finger 148 (FIGS. 1 and 3) on the operating member 24 and comprises a pair of contacts 149 and 151, the contact 149 being carried on a laterally extending arm 152 within the insulating block 127 and connected to the terminal 135, and the contact 151 being carried on a second arm 153 mounted on an insulating member 154 of flexible material, such as nylon or the like, the latter being adapted to be engaged by the finger 148. The arm 152 is normally spaced from the arm 153, when the members 24 and 27 are not engaged. The member 154 and arm 153 are sufficiently flexible so as to bend when engaged by the finger 148 so that the contacts 149 and 151 will close and permit current flow through the switch 146. Thus, the switch 146 is effective to break the circuit to the electromagnet 32 and prevent coupling of the operating member 24 to the actuating member 27 until the engaging portion 34 of the operating member 24 fully abuts the casing 33.

As an additional safety feature, the device 10 is also provided with means for preventing coupling of the members 24 and 27 and for preventing resistance to advancing movement of the accelerator pedal or throttle control member when the manually controlled means 96 (FIGS. 7–9) is adjusted to a high predetermined speed. Thus, when the manually controlled means 96 is so adjusted, the device 10 is completely disabled and the vehicle is operated only under its normal controls. According to the present invention such means preferably comprises a pair of normally closed switches 156 and 157 (see FIGS. 4 and 6), the switch 156 being placed in circuit with the electromagnet 32, and the switch 157 being placed in circuit with that side of the field winding of the electric motor 36 which is effective to move the actuating member 27 in the direction toward the idle position of the throttle control member. Both switches are preferably mounted in a switch block 158, which is mounted in the housing 16 adjacent the governor rod 94 (see FIG. 1), the switches being adapted to be sequentially opened by a predetermined downward movement of the governor rod 94 on adjustment thereof. To this end, the switch 156 includes a fixed contact 161 and a movable contact 162 mounted on a flexible arm 163 secured at its upper end in the switch block 158. The fixed contact 161 is connected to a terminal 164 which extends laterally from the switch block 158 and the movable contact 162 is connected to the wire 131 by a connection at the upper end of the arm 163. Similarly, the switch 157 includes a fixed contact 166 and a movable contact 167 mounted on a flexible arm 168 secured at its upper end in the switch block 158. The fixed contact 166 is connected to a terminal 169 which extends laterally from the switch block 158 above the terminal 164 and the movable contact 167 is connected to the wire 119. The terminals 164 and 169 are of course connected to continuations of the wires 131 and 119, respectively.

Figures 5, 6:
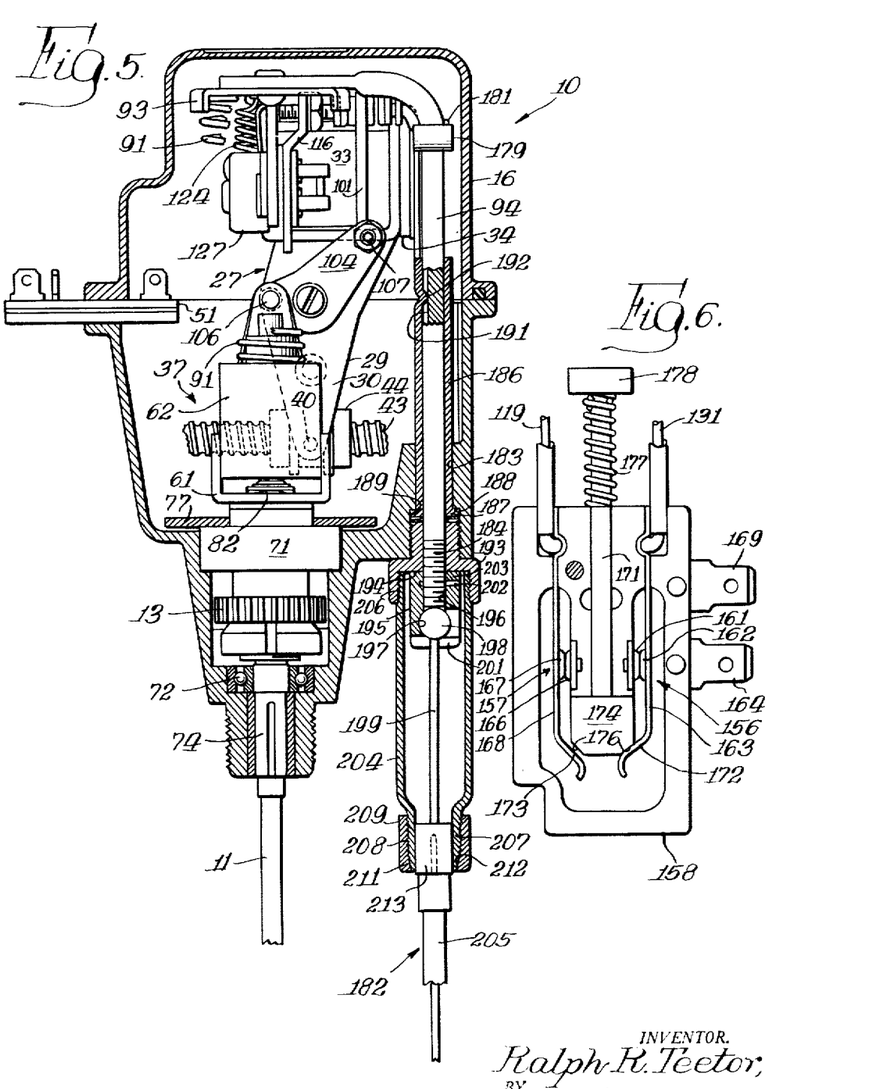
FIG. 5 is a sectional view taken on the line 5—5 of FIG. 2.
FIG. 6 is an enlarged fragmentary view, taken along the line 6—6 of FIG. 1.

Opening of the switches 156 and 157 is effected by a plunger 171, reciprocably mounted within the switch block 158 and adapted to engage the ends of the arms 163 and 168, which are bent inwardly as at 172 and 173, respectively. To this end, the plunger 171 includes an enlarged block 174 carried at its lower end, the lower side edges of the block preferably being chamfered or beveled as at 176 to provide a cam action upon engagement with the ends 172 and 173 upon downward movement of the plunger 171. As will be apparent from FIG. 6, the bend in the end 172 is higher than the bend in the end 173, so that the block 174 will engage the end 172 first and open switch 156 before switch 157, thereby providing the aforesaid sequential opening of the switches 156 and 157. The plunger 171 is normally maintained in an upwardly or outwardly extended position in relation to the block 174 so that the block 174 is out of contact with the bent ends 172 and 173 of the arms 166 and 167. To this end, a spring 177 is disposed around the plunger 171 in engagement with the switch block 158 and a head 178 on the upper end of the plunger 171. In FIG. 6, the plunger 171 is shown as in a non-depressed position.

Depression of the plunger 171 is effected by an abutment carried on the governor rod 94, which engages the head 178 when the manually controlled means 96 (FIGS. 7–9) is adjusted to a high predetermined vehicle speed. The abutment in this instance comprises a J-shaped clip 179 (FIGS. 2 and 5), having a pair of alined openings through each of its parallel leg portions to permit the clip 179 to grip the rod 94. Thus, a predetermined downward movement of the rod 94 by manipulation of the manually controlled means 96, which is effective to increase the compressive force of the governor spring on the sleeve 88 and raise the predetermined speed setting for the device, brings the clip 179 into engagement with the head 178 of plunger 171, at which point continued downward movement will sequentially open the switches 156 and 157. The vehicle will then operate in a conventional or normal manner, the device 10 being ineffective to maintain the vehicle at a constant speed or to offer resistance to advancing movement of the accelerator pedal. Preferably, the adjusted speed at which the switches 156 and 157 are opened is about 85 miles per hour.

In accordance with the present invention, a novel connection is employed between the governor rod 94 and a Bowden wire 182 which connects the governor rod 94 to the manually controlled means 96, to permit rapid assembly of the Bowden wire 182 and to correlate the setting of the manually controlled means 96 with the setting of the governor rod 37. To this end, the governor rod 94 is sufficiently long to extend through a bore 183 (FIG. 5) in the bottom of the housing 16, the lower end of the rod 94 being threaded as at 184. In order to prevent flexure of the governor rod 94 when the device is adjusted to the higher speed ranges, a tubular guide or support member 186 is provided to enclose the rod 94, the guide member 186 having a flange 187 around its lower end for engagement against a shoulder 188 formed by a counterbore 189 in the lower end of the bore 183. The rod 94 may be formed with an axial slot 191 and the guide member 186 may be indented, as at 192, for engagement in the slot 191, to prevent rotation of the rod 94 during adjustment. The lower end of the counterbore 189 is threaded to receive a fitting or nipple 193 which serves to maintain the flange 187 of the guide member 186 seated against the shoulder 188 and to provide an abutment surface 194 to limit movement of the governor rod 94, in a manner to be described.

An adjusting collar 195 is provided with a threaded longitudinal bore 196 at its upper end for engagement with the lower end 184 of the rod 94 and is preferably formed with a laterally opening spherical cavity 197 at its lower end, which is adapted to receive a ball 198 on the lower end of the cable 199 of the Bowden wire 182. The lower end of the collar 195 is provided with a slot 201 to accommodate passage of the Bowden wire cable 199 when the ball 198 is mounted in the cavity 197. The upper end of the collar 195 is provided with a transverse slot or cut 202 which extends through the bore 196 to partially sever the upper end portion, indicated at 203, of the collar 195 from the lower or main portion. The portion 203 is preferably compressed slightly toward the main portion to provide a clamping effect on the threaded end 184.

In order to prevent entrance of dust or other foreign material and to provide a mounting for the casing portion, indicated at 205, of the Bowden wire 182, a tubular sleeve member or dust shield 204 is provided to enclose these parts. The sleeve member 204 has its upper end threaded as at 206 into the clamp fitting 193 and its lower end 207 is necked down and externally threaded as at 208 to receive a clamping nut 209. The necked down end 207 normally has an internal diameter somewhat larger than the external diameter of the Bowden wire casing 205 to permit insertion of the latter therein, the end 207 being adapted to be collapsed around the casing 205 upon threaded engagement of the nut 209 to rigidly secure the casing 205 to the housing 16. To this end, the lower end 207 of the sleeve is tapered as at 211 and is slotted, and similarly the nut 209 is tapered as at 212 to provide the aforesaid clamping action when the parts are engaged. A bushing 213 may be provided at the end of the Bowden wire casing 205 to prevent deformation of the casing into contact with the cable 199. The sleeve member 204 has a sufficient length to accommodate the full travel of the collar 195.

With the foregoing structure, it will be apparent that no internal adjustment need be made in the device 10 in order to correlate the manually controlled means 96 with the governor 37. For this purpose, the collar 195 may be adjusted on the rod 94 so that the collar abuts the surface 194 when the governor spring 91 is set for the minimum speed. By adjustment of the collar 195 on the rod 94, the minimum compression of the spring 91 can be adjusted. The manually controlled means 96 is adjusted to the same minimum speed position, and the ball 198 on the end of the cable 199 is slipped into the cavity 197 in the collar 195. The shield 204, which had previously been slipped over the Bowden wire casing 205, is then screwed into place and the clamping nut 209 is screwed onto the shield 204 to clamp the casing 205.

Figures 7, 8, 9:
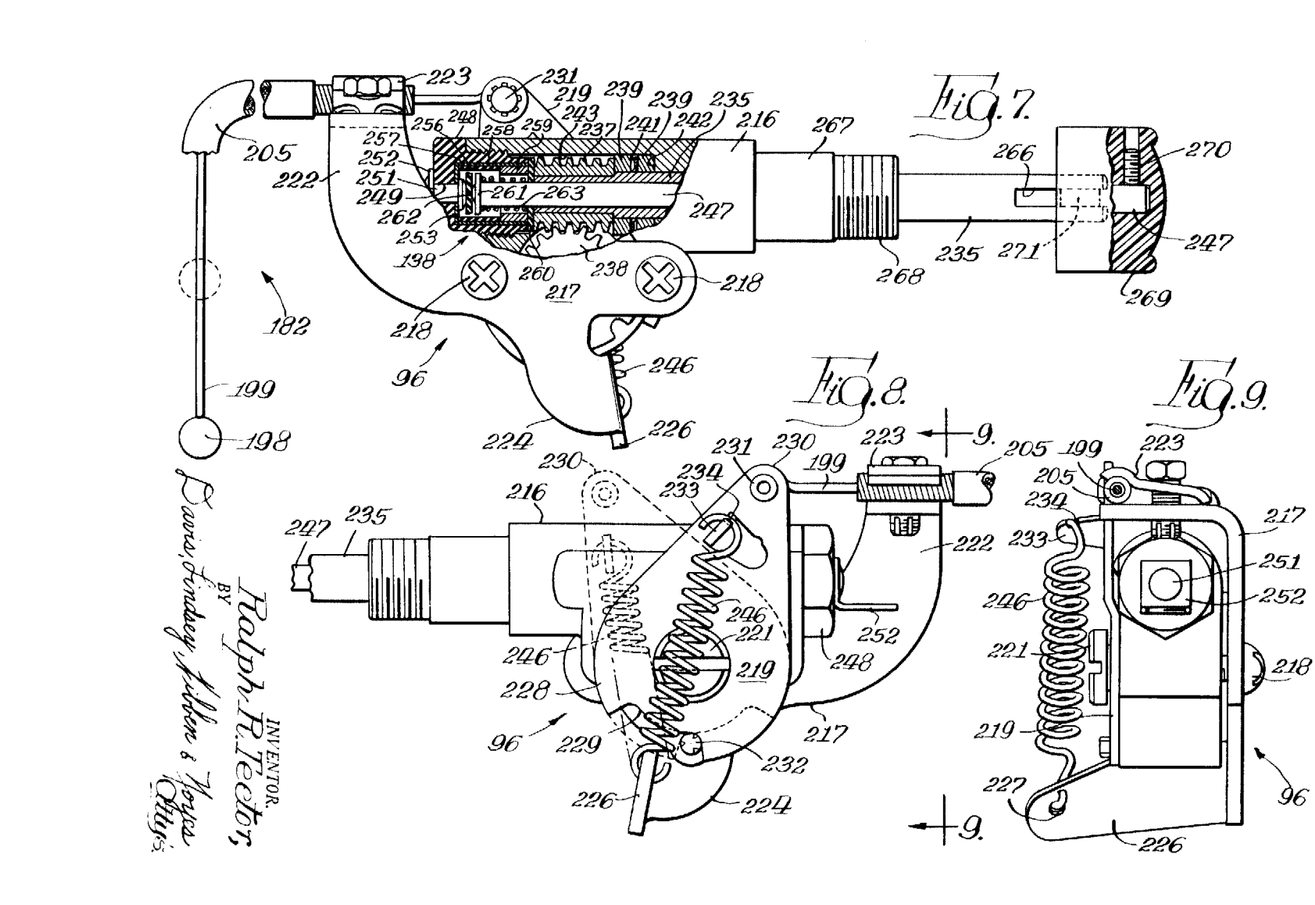
FIG. 7 is an elevational view, partially in section, of a manual control mechanism for adjusting the device to control the operating speed of the vehicle.
FIG. 8 is a view similar to FIG. 7 but of the opposite side of the mechanism.
FIG. 9 is a view taken along the line 9—9 of FIG. 8.

In FIGS. 7 to 9, the details of the manually controlled means 96 and switch 138 for initially energizing the electromagnet 32 are shown. Thus, according to the present invention, the means 96 preferably comprises a generally tubular body member 216 having a bracket 217 mounted on one side thereof as by screws 218, and a lever 219 is pivotally mounted on the opposite side of the body 216 by a screw 221. The bracket 217 includes a curved arm 222 which extends adjacent one end of the body 216, the end of the arm 222 being in spaced alignment with the free end of the lever 219 and having a clamp 223 for engagement with the Bowden wire casing 205. The bracket 217 also includes another arm 224 having its end portion 226 bent transversely toward the lever 219 so as to project past the plane of the lever 219, an opening 227 (FIG. 9) being provided in the remote end of the bent portion 226.

The lever 219 includes an enlarged rounded end portion 228 concentric with its pivotal axis, which is cutout to define an arcuate recess 229 (FIG. 8), and an end portion 230 which is adapted to be connected to the cable 199 of the Bowden wire 182 by a fastener 231. A lug or stop 232 (FIG. 8) extends transversely from the body 216 and into the recess 229 to limit the pivotal movement of the lever. The lever 219 also includes a struck-out prong or finger 233 adjacent its free end, which extends away from the body 216, the prong 233 having a notch 234 therein in general alignment with the opening 227 in the bent portion 226.

In order to swing the lever 219 between its limit positions, as shown in full and dotted lines in FIG. 8, and thus extend or retract the cable 199 of the Bowden wire, manually adjustable means is provided, including mechanism within the body member 216. Thus, an elongated tubular shaft 235 is rotatably journaled in the body member 216 and the shaft 235 extends outwardly beyond the body member 216 opposite to the end at which the Bowden wire 182 is connected. The shaft 235 has a worm 237 (FIG. 7) secured to its inner end, which meshes with a wheel 238 that is rotatably mounted in the body 216 and is connected to the lever 219. A pair of thrust washers 239 and an intermediate compression washer 241 may be provided between the worm 237 and a shoulder 242 formed by a counterbore 243 within the body 216, against which the washers bear. Rotation of the shaft 235 in either direction will thus swing the lever 219 to extend or retract the cable 199 of the Bowden wire 182.

Inasmuch as the Bowden wire cable 199 is subjected to the reaction force of the governor spring 91, a progressively greater torque would have to be applied to overcome the force of the spring when the device 10 is adjusted to the higher speed ranges. For this reason, means is provided for counteracting this force so that substantially the same torque is required to rotate the shaft 235 and adjust the governor spring 91, regardless of the direction of rotation and the force exerted by the spring 91. In the present instance, the counteracting means comprises a compensating spring 246 having one end secured in the opening 227 of the bent portion 226 of the bracket and its other end engaged in the slot 234 of the finger 233 on the lever 219, the spring 246 being under tension. When the parts are in the full line position shown in FIG. 8, the spring exerts only a small force tending to swing the lever 219 against the force exerted by the governor spring 91. Rotation of the lever 219 to the dotted line position of FIG. 8 increases the leverage of the spring 246 on the lever 219, thereby causing it to exert a progressively increasing force on the lever 219 opposite to that caused by compression of the governor spring 91. The arrangement is such that the counteracting force imposed on the lever 219 by the spring is substantially equal to that exerted on the lever 219 by the governor spring 91 through the Bowden wire cable 199.

As aforementioned, the manually controlled means 96 includes the switch 138 which is manually actuated by the driver to initially energize the electromagnet 32. According to the present invention, the switch 138 is mounted in the body 216 adjacent the end thereof at which the Bowden wire 182 is connected, the switch 138 being normally open and adapted to be closed by outward movement of a rod 247 mounted within the tubular shaft 235. An insulating plug 248 is threaded into the end of the body 216 and has a central axial bore 249 therethrough in which a rivet 251 is disposed. The rivet 251 secures a terminal lug 252 (FIGS. 7–9) to the outer end face of the plug 248, the lug 252 being connected to the wire 137. The inner end of the rivet 251 has a head effective to engage and retain a conductor member 253 disposed adjacent the inner end of a counterbore 256 formed in the plug member 248. The member 253 includes a pair of axially extending arms 258. A sleeve member 259 is disposed between the ends of the arms 258 in contact therewith and flush with the inner end of the plug member 248, and an insulating sleeve 257 is positioned between the arms 258 inwardly of the sleeve member 259. Abutting against the end of the sleeve member 259 is an insulating washer 260 which prevents grounding of the sleeve member 259 through the worm 237.

The sleeve member 259 constitutes one contact of the switch 138, and a washer 261 is secured to the inner end of the rod 247, to provide the other contact. An insulating disc 262 is interposed between the end of the rod 247 and the head of the rivet 251 to prevent current flow therebetween when the rod 247 is positioned inwardly of the body 216 and the switch 138 is open. Tending to hold the rod 247 in this position, a coil spring 263 is disposed around the inner end of the rod 247 behind the washer 261 for engagement with the insulating washer 260. The spring 263 is effective to normally bias the rod 247 into the body 216 toward the plug member 248 and into contact with the insulating disc 262 to hold the switch 138 open. The rod 247 is journalled in the tubular shaft 235 and is thus grounded through the body 216 to the frame of the vehicle. Thus, withdrawal of the rod 247 relative to the shaft 235 and body 216 moves the washer 261 into engagement with the sleeve member 259 and closes the switch 138 to initially energize the electromagnet 32, as aforesaid, to couple the operating member 24 to the actuating member 27 and thereby bring the vehicle under automatic operation. A knob 269 may be secured to the outer end of the rod 247 as by a set screw 270, and a vane 271 is provided to fit in a longitudinal slot 266 in the outer end of the shaft 235. Outward movement of the knob 269 is thus effective to shift the rod 247 and close the switch 138, and rotation of the knob rotates the worm 237, due to the driving engagement of the vane 271 with the slot 266.

In order to facilitate mounting of the manually controlled means 96 in the dash panel of the vehicle, or in a mounting bracket, the body 216 is provided with a reduced diameter portion 267 which may be threaded as at 268 to receive a nut.

While only one embodiment of the invention has been herein illustrated and described it will be understood that modifications and variations thereof may be effected without departing from the scope of the invention as set forth in the appended claims.

I claim:

1. In a speed control device for an automotive vehicle having a throttle control element, said device including an operating member movable with said throttle control member, an actuating member for moving said operating member, drive means including a reversible motor connected to said actuating member and operable to move said actuating member in opposite directions, means for coupling said operating member to said actuating member including an electromagnet and an armature carried by said actuating member for securing said operating member thereto, and a governor responsive to the speed of said vehicle for controlling said motor to maintain said vehicle at a predetermined speed and including a governor spring and means for adjusting said spring to vary said predetermined speed, the improvement comprising means for preventing coupling of said members and movement of said actuating member in a direction toward the idle position when said governor spring is adjusted to a certain predetermined vehicle speed, said coupling preventing means comprising a pair of normally closed switches respectively in circuit with said motor and said electromagnet, and means for opening said switches when said spring is adjusted to said higher vehicle speed.

2. The combination of claim 1 in which said adjusting means includes an abutment for opening said switches.

3. The combination of claim 2, in which said switches include a reciprocable plunger engageable by the abutment for opening said switches.

4. The combination of claim 3, in which said plunger first opens the switch in circuit with said electromagnet and thereafter opens the switch in circuit with said motor.

5. In a speed control device for an automotive vehicle having a throttle control element, said device comprising means for holding said control element in a position for operating the vehicle at a predetermined speed including a governor having a spring adjustable to vary said speed, electrical means for rendering said holding means operable, manually controlled means for adjusting said spring and for energizing said electrical means comprising a manually rotatable tubular member for adjusting said spring, a longitudinally movable rod mounted in said tubular member, a normally open switch in circuit with said electrical means and adapted to be closed on movement of said rod to energize said electrical means, and a knob slidably but non-rotatably connected to said tubular member and rigidly connected to said rod for rotating said tubular member and for moving said rod.

6. In a speed control device for an automotive vehicle having a driver-operated throttle control member, said device comprising means for opposing movement of said control member including a housing, a governor mounted in said housing and responsive to the speed of the vehicle for rendering said means operable at a predetermined vehicle speed, said governor including a spring and a shiftable rod having one end engaging said spring for compressing the latter to vary the speed at which said governor renders said opposing means operable, the improvement of means for adjusting the position of said rod to vary the compression of said spring comprising a member connected to the end of said rod opposite from its spring engaging end and adjustable thereon, said member being adapted to engage said housing to provide a variable minimum compression condition of said spring, a flexible connector including a wire and a casing therefor, said wire being connected to said member to permit adjustment of said rod from a remote location, and said casing being rigidly connected to said housing.

7. The combination according to claim 6, in which said member threadedly engages said rod and includes means for maintaining an adjusted position thereof on said rod.

8. The combination according to claim 6, in which a sleeve at one end encloses said member and has its other end rigidly clamped to said casing.

9. In a speed control device for an automotive vehicle having a driver-operated throttle control member, said device comprising means for opposing movement of said control member including a housing, a governor mounted in said housing and responsive to the speed of the vehicle for rendering said means operable at a predetermined vehicle speed, said governor including a spring and a shiftable rod having one end engaging said spring for compressing the latter to vary the speed at which said governor renders said opposing means operable, the combination with said rod of means for adjusting the position of said rod to vary the compression of said spring comprising a member connected to the end of said rod opposite from its spring-engaging end and adjustable thereon, said member having a slotted laterally open spherical cavity, a flexible connector including a wire and a casing therefor, said wire having a ball at its end adapted to be received in said cavity to permit adjustment of said rod from a remote location, and said casing being rigidly connected to said housing.

10. A speed control device for an automotive vehicle having a throttle control element, said device including an operating member movable with said throttle control element, an actuating member movable in both directions, manually controlled means for cupling said actuating member to said operating member for moving said operating member in both directions, said manually controlled means including an electrical circuit, means responsive to the speed of said vehicle for varying the position of said members to maintain said vehicle at a substantially constant predetermined speed when said members are coupled, and means for preventing coupling of said members when said vehicle is operating below said predetermined speed comprising a switch in said circuit, said members being engageable and said switch being closed by engagement of said members.

11. A speed control device for an automotive vehicle having a throttle control element, said device including an operating member movable with said throttle control element, an actuating member movable in both directions, manually controlled means for coupling said actuating member to said operating member for moving said operating member in both directions, said manually controlled means comprising an electromagnet having an armature mounted on one of said members, said armature being engageable with the other of said members for coupling said members together when said electromagnet is energized, means responsive to the speed of said vehicle for varying the position of said members to maintain said vehicle at a substantially constant predetermined speed when said members are coupled, and means for preventing coupling of said members when said vehicle is operating below said predetermined speed comprising a switch in circuit with said electromagnet.

12. The combination of claim 11, in which said electromagnet is mounted on said actuating member, said armature is engageable with said operating member, and said switch is operable by said operating member on engagement of the latter with said actuating member.

13. The combination of claim 12, in which said switch is mounted on the opposite side of said actuating member from said operating member and is normally open, and said operating member has an arm extending toward said switch and adapted to close said switch when said members are in engagement.

14. The combination of claim 11, in which said manually controlled means includes a circuit having a manually operable switch for energizing said electromagnet and a holding switch for maintaining said electromagnet energized when said manually operable switch is released, and said switch for preventing coupling is operable on engagement of said members and is located in said circuit between said electromagnet and said manually operable switch for preventing energization of said electromagnet by said manually operable switch.

15. In a speed control device for an automotive vehicle having a throttle control element, said device including an operating member movable with said throttle control element, an actuating member adapted to be coupled to said operating member for moving the latter in opposite directions, a holding coil for maintaining said members coupled, adjustable means responsive to the speed of said vehicle for effecting movement of said actuating member in a direction away from idle position when said vehicle is operating below a predetermined speed and in a direction toward idle position when said vehicle is operating above said predetermined speed, and means for preventing coupling of said members upon adjustment of said speed responsive means to a certain predetermined speed, said coupling preventing means comprising a normally closed switch in circuit with said coil and operable to be opened to prevent energization of the coil when said speed responsive means is adjusted to said certain predetermined speed.

16. In a speed control device for an automotive vehicle having a driver operated throttle control member, and said device comprising means for opposing movement of said control member including a governor responsive to the speed of the vehicle for rendering said means operable at a predetermined vehicle speed, said governor having a spring adjustable to vary the speed at which said governor renders said opposing means operable, and means for adjusting said spring operable to limit the maximum effort required for such adjustment regardless of the position of adjustment, said adjusting means comprising a manually operable member subjected to the varying force of said governor spring throughout the range of adjustment thereof, and compensating spring means for exerting a force on said member opposing the force exerted by said governor spring on said member, the effectiveness of the force of said compensating spring means on said member increasing with adjustment of said member in a direction for increasing the force exerted by said governor spring.

17. The combination according to claim 16, in which said spring adjusting means includes an element for compressing the governor spring, and a lever connected to said element for moving the latter, said compensating spring means being connected to said lever and movable from a position substantially aligned with said lever to a position angularly inclined to said lever on adjustment of said lever in a direction for increasing the force exerted by said governor spring.

18. In a speed control device for an automotive vehicle having a driver operated throttle control member, said device comprising means for opposing movement of said control member including a governor responsive to the speed of the vehicle for rendering said means operable at a predetermined vehicle speed, said governor having a spring adjustable to vary the speed at which said governor renders said opposing means operable, means for adjusting said governor spring operable to limit the maximum effort required for such adjustment regardless of the position of adjustment comprising a pivotally mounted lever connected at one end to said governor spring for adjusting the latter, a manually operable member for shifting said lever, and compensating spring means connected to said lever to oppose the force exerted by said governor spring on said lever, said compensating spring means being mounted for movement between a position substantially coincident with a line from said pivot to said one end of said lever and a position angularly inclined to said line on movement of said lever, whereby said compensating spring means exerts an increasing force on said lever on movement of the latter to increase the force exerted by said governor spring.

19. The combination according to claim 18, in which a bracket pivotally supports said lever, and said compensating spring is connected at one end to said lever and at its other end to said bracket.

20. The combination of claim 19, in which said lever and said bracket have cooperating stop means to limit the shifting of said lever to a range required to adjust said governor spring throughout its range.

21. The combination of claim 18, in which said manually operable member is rotatable and has a worm and wheel connection with said lever.

References Cited in the file of this patent

UNITED STATES PATENTS

| | | |
|---|---|---|
| 666,764 | Lindstrom et al. | Jan. 29, 1901 |
| 1,111,670 | Peebles | Sept. 22, 1914 |
| 1,614,982 | Friesen | Jan. 18, 1927 |
| 2,313,505 | Benjamin | Mar. 9, 1943 |
| 2,661,071 | Hoener | Dec. 1, 1953 |
| 2,671,542 | Robnett | Mar. 9, 1954 |
| 2,755,877 | Kelem | July 24, 1956 |
| 2,781,430 | Thatcher | Feb. 12, 1957 |
| 2,816,617 | Lee | Dec. 17, 1957 |
| 2,822,881 | Treharne | Feb. 11, 1958 |
| 2,897,906 | Brueder | Aug. 4, 1959 |
| 2,916,100 | Teetor | Dec. 8, 1959 |
| 2,972,390 | Bunker et al. | Feb. 21, 1961 |
| 2,973,051 | Teetor | Feb. 28, 1961 |
| 2,990,825 | Fuller et al. | July 4, 1961 |

UNITED STATES PATENT OFFICE
CERTIFICATE OF CORRECTION

Patent No. 3,090,460                              May 21, 1963

Ralph R. Teetor

It is hereby certified that error appears in the above numbered patent requiring correction and that the said Letters Patent should read as corrected below.

Column 5, line 47, before "shaft" insert -- upper end 66 of the --; same line, after "abuts" insert -- against --; line 48, strike out "upper"; same line, strike out "66 against the ends"; line 51, before "the", first occurrence, insert -- on --; column 14, line 42, for "cupling" read -- coupling --.

Signed and sealed this 26th day of November 1963.

(SEAL)
Attest:
ERNEST W. SWIDER                          EDWIN L. REYNOLDS Attesting Officer                            Acting Commissioner of Patents